Aug. 15, 1950 C. W. SCHOTT 2,518,943
METHOD AND APPARATUS FOR TESTING METAL BARS
Filed June 7, 1945
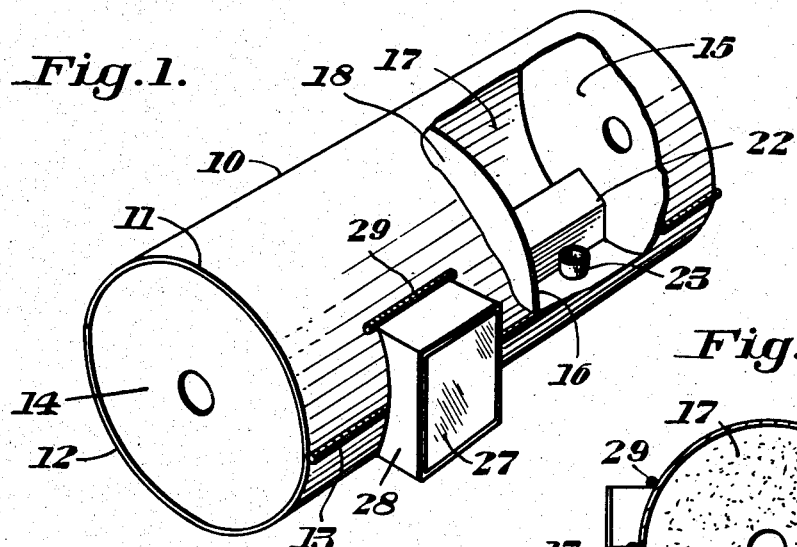
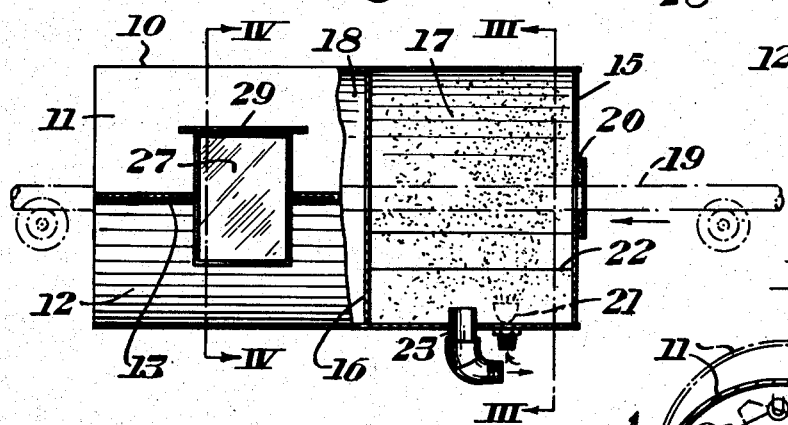
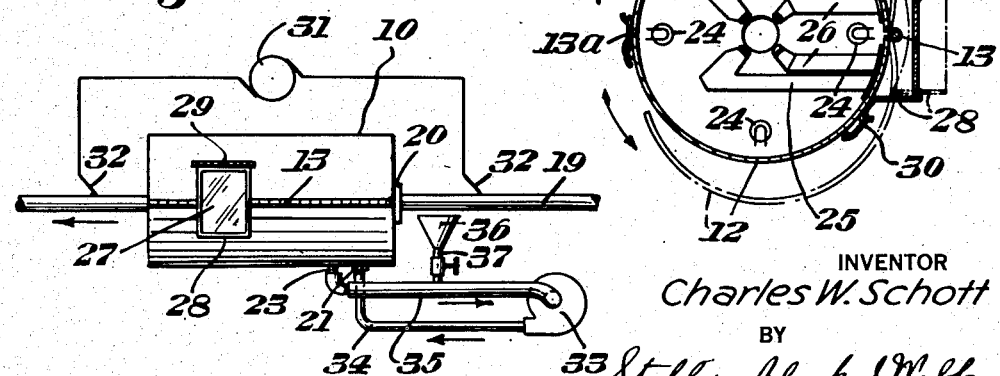
INVENTOR
Charles W. Schott
BY
Stebbins, Blenko & Webb
ATTORNEYS Patented Aug. 15, 1950

2,518,943

UNITED STATES PATENT OFFICE 2,518,943

METHOD AND APPARATUS FOR TESTING METAL BARS

Charles W. Schott, Duquesne, Pa.

Application June 7, 1945, Serial No. 597,994

6 Claims. (Cl. 175—183)

This invention relates to the testing of metal products and, in particular, to the testing of magnetic material, such as iron or steel, in the form of elongated pieces, i. e., rods, bars, or the like.

The testing of members composed of magnetic metal and having relatively small lengths, by magnetizing them and applying thereto a magnetic dust, such as powdered iron, has proved very successful for revealing hidden defects. The usual practice of the method, however, is laborious, time-consuming and, therefore, rather expensive. Thus it has not been adapted for the routine testing of tonnage products because the relatively low price thereof does not permit the use of expensive testing methods in connection therewith.

I have invented a novel method and apparatus for testing members of magnetic material and indefinite length, utilizing magnetic dust. The test is made progressively on the piece as it travels along a predetermined path without any manual effort and requiring the attention of only a single observer to detect indications of subsurface defects. In a preferred practice of the invention, I pass a bar longitudinally through a chamber and magnetize at least the portion of the bar within the chamber. I also maintain a suspension of magnetic dust in the atmosphere of the chamber. As a result, the dust particles from the atmosphere cling to the surface of the bar in portions adjacent such defects, so as to be readily distinguishable from the remainder of the bar surface, in accordance with the known principles of testing by magnetic powder. By observing the bar as it emerges from the dust chamber, the presence of hidden defects may immediately be noted.

The apparatus which I have invented for carrying out my improved method comprises essentially an enclosure adapted to admit the bar or specimen under test, moving longitudinally, and including a dust chamber and an inspection chamber. I provide means for supplying magnetic dust to the dust chamber and maintaining it in the form of a suspension or cloud. The inspection chamber is preferably provided with means for projecting an image of the surface of the bar to the exterior of the chamber, thus facilitating the inspection operation.

Further details, novel features and advantages of the invention will be made apparent during the following complete description and explanation, referring to the accompanying drawings illustrating a preferred embodiment of the apparatus. In the drawings:

Figure 1 is a perspective view of the enclosure including the dust chamber and inspection chamber;

Figure 2 is a view partly in elevation and partly in section along a central longitudinal vertical plane;

Figures 3 and 4 are transverse sectional views along the planes of lines III—III and IV—IV, respectively, of Figure 2; and Figure 5 is a diagram illustrating the apparatus as a whole.

Referring in detail to the drawings, the apparatus of my invention comprises an enclosure 10 which may conveniently be composed of semi-cylindrical members 11 and 12 hinged together at 13 and provided with latches 13a and having end walls 14 and 15. A partition 16 intermediate the ends of the enclosure divides it into a dust chamber 17 and an inspection chamber 18. Alined central holes in the end walls of the partition permit a bar 19, or the like, to be passed longitudinally through the enclosure. The end wall 15 through which the bar first passes has a sealing ring 20 thereon of suitable material having a snug fit around the bar.

A nozzle 21 extends through the wall of the dust chamber 17 and is connected to a source of magnetic dust, such as powdered iron, as will be described later. A baffle 22 extends longitudinally of the dust chamber above the nozzle to impart a generally swirling motion to the magnetic particles and prevent direct impingement of the jet on the bar. An outlet connection 23 also extends through the wall of the dust chamber and is connected to a return pipe leading to a blower or other source of air serving as a medium for entraining the dust particles, as will be described hereinafter in greater detail.

The inspection chamber 18 is illuminated by lamps 24 and is provided with means permitting visual inspection of the surface of the bar as it passes therethrough. Such means may be in the form of projectors 25 and 26, each including the necessary lenses, mirrors or prisms mounted in suitable tubes for throwing an image of a portion of the bar surface onto a screen 27. As shown in Figure 4, the screen 27 is mounted in a frame or box 28 projecting laterally from the enclosure and hinged at 29 to the upper semi-cylindrical member 11 thereof. A latch 30 holds the box snugly against the enclosure but permits its separation therefrom when the enclosure is open, as illustrated in chain lines in Figure 4.

In utilizing the apparatus described above to carry out the method of my invention, I prefer to incorporate it in a system such as illustrated diagrammatically in Figure 5. As there illustrated, I provide means for magnetizing the bar 19, preferably by passing an electric current therethrough. A generator 31, for example, may be connected to the bar on opposite sides of the enclosure 10 by brushes 32, or other suitable means may be employed for supplying current to or otherwise magnetizing the bar. The current thus circulated through the portion of the bar between the brushes creates a magnetic field circumferentially of the bar. The portion of the bar within the dust chamber 17 being thus magnetized, is subjected to a suspension or cloud of magnetic particles in the atmosphere thereof. As a result, the particles will adhere in patches to the surface of the bar adjacent internal or subsurface defects, for subsequent observation in the chamber 18. Dust is supplied to the nozzle 21 by a blower 33 through a pipe 34. The outlet 23 of the dust chamber is connected by a pipe 35 to the blower inlet. A dust reservoir 36 in the form of a hopper communicates with the pipe 35 by a connection 37 having a control valve therein whereby the necessary make up may be introduced to the stream of air circulating through the dust chamber.

The patches of magnetic dust adhering to the surface of the bar adjacent internal defects therein are readily observable on the screen 27 as they pass before the image projecting means 25. The latter are distributed circumferentially of the bar and thereby give a picture of the entire circumference on the screen 27. On observing a patch of adherent dust, the inspector may by suitable means (not shown) apply a marking to the bar giving a permanent indication of the defect. By maintaining the magnetic dust suspended in the atmosphere of the inspection chamber, only a minimum amount of dust settles on the sound portions of the bar, thus making it easy to spot subsurface defects.

It will be apparent from the foregoing that the invention provides for the continuous testing of elongated members of magnetic metal with a minimum of labor and attention. The testing operation thus adds very little to the cost of the product and may, therefore, be applied to products produced in relatively large amounts. The apparatus is simple and inexpensive to construct, requires but little attention during operation, the services of one inspector sufficing, as above stated, to observe the appearance of the significant adherent patches of dust on the surface of the bar adjacent the location of an internal defect.

Although I have illustrated and described but a preferred embodiment and practice of the invention, it will be understood that changes in the structure and procedure may be made without departing from the spirit of the invention or the scope of the appended claims.

I claim:

1. An apparatus for continuous testing of moving bars of magnetic material or the like comprising a casing having openings in opposite walls permitting a bar to be passed longitudinally therethrough, partition means intermediate said walls and having a corresponding opening therein for said bar, said partition forming a pair of chambers, means for magnetizing the portion of the bar within said chambers, means for circulating magnetic dust through the atmosphere within one of said chambers without direct impingement on the bar and viewing means in the other chamber.

2. In apparatus for continuous testing of moving bars of magnetic material or the like having a portion thereof magnetized, a casing surrounding the magnetized portion of the bar and having openings in the opposite walls thereof permitting the bar to be passed longitudinally therethrough, partition means intermediate said walls and having a corresponding opening therein for the passage of the bar, said partition forming within the casing a pair of chambers, means for introducing and circulating magnetic dust through the atmosphere within one of said chambers without direct impingement on the bar and viewing means in the other chamber.

3. An apparatus for continuous testing of moving bars of magnetic material or the like comprising a casing having openings in opposite walls permitting a bar to be passed longitudinally therethrough, partition means intermediate said walls and having a corresponding opening therein for said bar, said partition forming a pair of chambers, electrical contacts at each end of said casing whereby an electrical current for magnetizing the bar may be passed through the portion of the bar within the two chambers formed by the casing, means for circulating magnetic dust through the atmosphere within one of said chambers and viewing means in the other chamber.

4. An apparatus for continuous testing of moving bars of magnetic material or the like comprising a casing having openings in opposite walls permitting a bar to be passed longitudinally therethrough, partition means intermediate said walls and having a corresponding opening therein for said bar, said partition forming a pair of chambers, means for magnetizing the portion of the bar within said chambers, a nozzle for introducing a gas-borne spray of magnetic dust into one of said chambers, a baffle extending longitudinally of said chamber above the nozzle whereby a generally swirling motion is imparted to the gas-borne particles, means for removing the gas-borne particles from the chamber returning them to the nozzle and viewing means in the other chamber.

5. In a continuous method for testing an elongated bar of magnetic material, the steps including continuously passing the bar longitudinally through a closed chamber, simultaneously magnetizing that portion of the bar within the chamber, maintaining an atmosphere of magnetic dust in gaseous suspension in said chamber surrounding the magnetized bar, passing the bar out of said chamber while maintaining it magnetized and examining the bar for adherent patches of dust.

6. In a continuous method for testing an elongated bar of magnetic material, the steps including continuously passing the bar longitudinally through a closed testing chamber divided into two parts, simultaneously magnetizing the portion of the bar within one part of the chamber and maintaining an atmosphere of magnetic dust in gaseous suspension in said chamber, passing said portion of the bar into the other part of said chamber, maintaining the bar magnetized all the while and examining the bar for adherent patches of dust while in said other part.

CHARLES W. SCHOTT.

REFERENCES CITED

The following references are of record in the file of this patent:

UNITED STATES PATENTS

| Number | Name | Date |
|---|---|---|
| 1,426,384 | Hoke | Aug. 22, 1922 |
| 1,960,898 | De Forest | May 29, 1934 |
| 2,011,408 | Jacobs | Aug. 13, 1935 |
| 2,057,091 | Eurich et al. | Oct. 13, 1936 |
| 2,217,733 | De Forest | Oct. 15, 1940 |
| 2,252,475 | Unger et al. | Aug. 12, 1941 |
| 2,358,782 | Beach | Sept. 26, 1944 |
| 2,455,874 | Newman | Dec. 7, 1948 |

FOREIGN PATENTS

| Number | Country | Date |
|---|---|---|
| 502,557 | Great Britain | Dec. 18, 1937 |